Jan. 21, 1964   E. BAJENSKI ETAL   3,118,301
STRAIN GAGE FOR HIGH ELONGATION
Filed June 16, 1960

INVENTORS.
EDMUND BAJENSKI
BY CHARLES VARVARO

ATTORNEY 3,118,301
STRAIN GAGE FOR HIGH ELONGATION
Edmund Bajenski, Mogadore, and Charles Varvaro, Akron, Ohio, assignors to Goodyear Aerospace Corporation, a corporation of Delaware
Filed June 16, 1960, Ser. No. 36,594
8 Claims. (Cl. 73—88.5)

This invention relates to electrical strain gauges of the type wherein the resistance of the wire is altered in proportion to the strain to which the gauge is subjected, and, more particularly, is concerned with gauges of this type particularly adapted for measurements of strains exceeding one percent elongation of the material tested.

It has been proposed heretofore to provide electrical strain gauges for attachment to various materials, the strain gauges including wires which are stressed and elongated in tension to thereby change their electrical resistance substantially in proportion to the strain to which the materials tested are submitted. Such known strain gauges perform satisfactorily when the elongations of the materials tested do not exceed about one percent. However, when materials, having elongations of greater than one percent, usually within the elastic limit of the material, are tested, known electric strain gauges responding to tension forces only are not satisfactory. Thus, when materials like fabric, rubber, and certain plastics are tested, elongations of greater than one percent, and often much greater than one percent are experienced, and known strain gauges are not satisfactory.

It is the general object of the invention to avoid and overcome the foregoing and other difficulties of and objections to prior art practices by the provision of an improved strain gauge of the wire type and adapted to successfully test the strains in fabric, rubber, and other high elongation material, the strain gauge being characterized by simplicity, inexpensiveness, ease of application, long life, and accurate strain indication.

Another object of the invention is to provide a wire strain gauge of the character described wherein the wire is in the form of a spring coil attached by adhesive means to the materials to be tested and positioned so that the coil is expanded in the direction of the forces applying the strain to the material tested, the wire of the coil being stressed in both tension and compression by the elongation of the material being tested.

Another object of the invention is the provision of a wire strain gauge of the character described in which the wire is so secured to the material being tested that the wire is stressed in torsion upon the elongation of the material being tested.

The foregoing objects of the invention, and other objects which will become apparent as the description proceeds, are achieved by the provision of the combination in a strain gauge of a material capable of elongations within its elastic limit of greater than about 1% when subject to stresses, a helically coiled strain gauge wire having a diameter of about one mil and coiled to an internal diameter of about one mil positioned against the surface of the material with the axis of the coil in the direction of the stress to be applied to the material, adhesive means securing each convolution of the coil independently to the material in the region where each convolution engages the material, and means for measuring any changes in the electric resistance of the coil when the material is subjected to stresses effecting elongations of greater than about 1%.

In the drawings:
FIG. 1 is a diagrammatic view in broken-away perspective form of a strain gauge incorporating the principles of the invention;

Having more particular reference to the drawings, the numeral 1 indicates a portion of the material to be tested, for example a piece of rubberized fabric or plastic impregnated or coated fabric to be used as a gas or liquid container.

Figure 1:
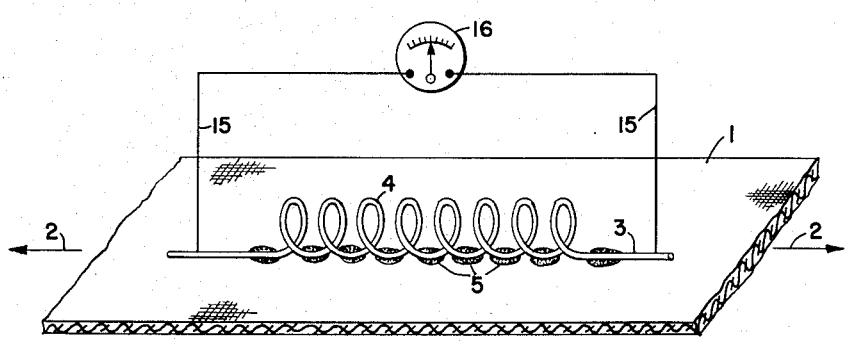

As heretofore indicated, the material to be tested may take a wide variety of forms or types, but, in general within the most useful range of the invention can be said to constitute a material capable of elongation within its elastic limit of greater than about one percent, and often considerably greater than one percent. While the strain gauge of the invention is operable at elongations less than one percent, the auxiliary measuring equipment described appears to be more costly in most instances than conventional strain gauge equipment readily available for elongation ranges below about 1%. In FIG. 1, the material 1 is adapted to be subjected to stresses applied in the direction of the arrows 2, to subject the material 1 to strains in tension often considerably exceeding one percent. It will be understood that the stresses 2 can be applied in a variety of ways, and under a variety of circumstances, for example by means of jaws of a test machine, by means of internal fluid pressure in an actual operative structure, and the like.

Usually the strain gauge wire is mounted directly upon the material to be tested, and as shown in FIG. 1, a strain gauge wire 3 of the resistance type, such as wire of constantan, Karma, nickel-copper alloys, and the like, utilized in a conventional strain gauge, and having a diameter, for example, of as small as about one fifth mil, is formed into a coil of an internal diameter as small as one-half mil and preferably a helical coil as shown, the coil being given the numeral 4 and comprising a plurality of substantially identical turns or convolutions.

Adhesive means 5, for example a quick-setting cement, are utilized to secure each convolution of the coil independently to the material 1 in the area of the convolution engaging the material 1 or held by the adhesive in close proximity to the material 1. This can be accomplished by spot-adhering each convolution, or by simply setting the coil 4 onto a line of adhesive. It will be noted that the coil 4 is mounted with its axis substantially parallel to the direction in which the stresses 2 are applied to the material 1, and with the patches of adhesive 5 being spaced one from another in this same direction.

Figure 2:
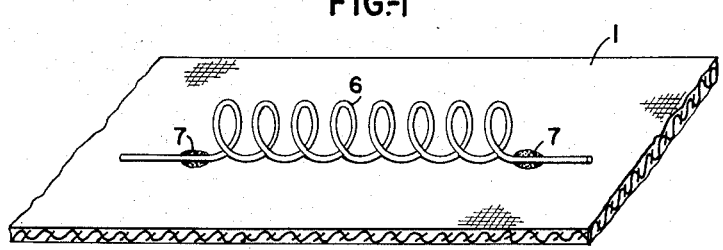
FIG. 2 is a similar view of a modified form of the coil of FIG. 1.

Although the preferred mounting is as described, at least some of the advantages of the invention are obtained if a coil 6 is secured to the material 1, as shown in FIG. 2, only adjacent each end 7 of the coil, leaving a number of the convolutions of the coil unsecured to the material 1 between the ends of the coil.

The invention also contemplates utilizing a structure substantially of the type shown in FIGS. 1 through 4 and described as a strain gauge wafer in which the material 1 is made of soft and resilient material such as rubber, for example ½₂ of an inch thick and several inches long and an inch wide with the coil 4 secured thereto, all as shown, to provide a strain gauge wafer of a type which can be adhesively or otherwise secured to the actual material to be tested.

Although not preferred in the practice of the invention it is possible to obtain at least some of the advantages of the invention if the coil 4 is made other than helically round, for example of some other cross section, or if the coil is made of a sinuous form.

Figure 3:
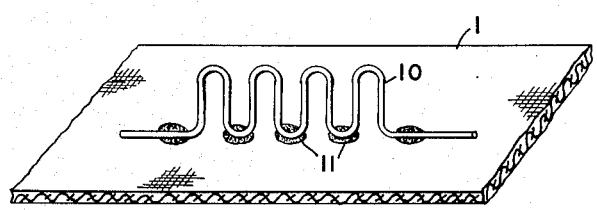
FIG. 3 is a similar view of a modified strain wire arrangement.
Figure 4:
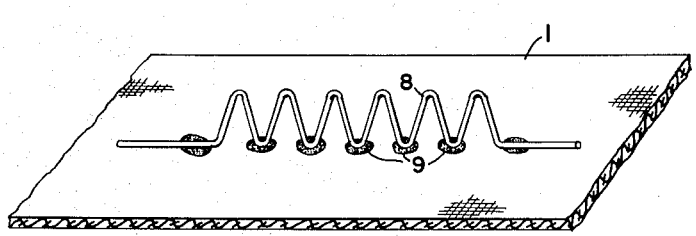
FIG. 4 is a similar view of another modified strain wire arrangement.

Examples of such modifications are shown in FIGS. 3 and 4. FIG. 4 shows a strain gauge element 8 found in a zig-zag pattern with all the bends 9 lying along one of the pattern sides being individually adhesively secured to the material 1. FIG. 3 shows a strain element 10 formed in sinusoidal manner with adhesive securing the portion of the transition bends 11 along one of the pattern sides to the material 1. In both FIGS. 3 and 4, adhesive connections can be limited to only the terminal ends if desired, as described above in connection with FIG. 2. It will be apparent that the patterns 8 and 10 of FIGS. 3 and 4 respectively may lie flat on the surface of the material 1 instead of extending outwardly therefrom as shown. Likewise, the coils of FIGS. 1 or 2 may be in flattened form with suitable insulated wire being provided, if necessary, to prevent electrical shorts at overlying wires if present.

Figure 5:
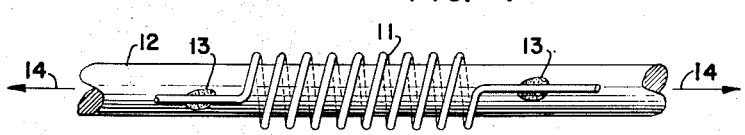
FIG. 5 is a perspective view showing the use of the invention in conjunction with a filamentary strand.

FIG. 5 illustrates another variation of the use of a helical coil 11, similar to coil 4 of FIG. 3, to measure the elongation of a filamentary strand 12. The coil 11 is fastened by means of an adhesive 13 at least at both ends to the strand 12, with the strand 12 lying internally of the coil 11 and is stressed as described hereinabove by forces acting in the direction indicated by the arrows 14. Further adhesive connections can be made at 360° intervals around the filament between the coil 11 and the filament 12 if desired.

Completing the assembly of the combination are electric leads 15 (FIG. 1) connected to the ends of the coil 4 and in turn connected to a suitable apparatus 16, such as an ohmmeter or a Wheatstone bridge for measuring any change in the electric resistance of the wire 3 during the stressing of the material 1. It will be understood that similar connections and apparatus are used with the arrangements shown in FIGS. 2 through 5.

A complete technical explanation fully covering the phenomena which result in the change of resistance of the strain gauge wire when the material is subjected to stresses, usually exceeding elongations of one percent, has not been completed. Suffice it to say here that tests results have conclusively indicated that so long as the strain wire is subjected to both tension and compressive forces during the test, or so long as it is subjected to torsion stresses during the test that a measurable change results in the electric resistance of the wire and can be determined by suitable indicating apparatus as described, so that with proper calibration the strains in the material can be determined.

It will be recognized that the objects of the invention have been achieved. The wire strain gauge combination of the invention can be utilized in testing materials, such as fabric, rubber, plastic, and the like to elongations far in excess of one percent, and over many, many cycles of repetition all without failure or destruction of the strain gauge wire which operates well within the limits of its elasticity.

While a certain representative embodiment and details have been shown for the purpose of illustrating the invention, it will be apparent to those skilled in this art that various changes and modifications may be made therein without departing from the spirit or scope of the invention.

What is claimed is:

1. The combination in a strain gauge of a material capable of elongations within its elastic limit of greater than about 1% when subject to stresses, a helically coiled strain gauge wire having a diameter of about one mil and coiled to an internal diameter of about one mil positioned in an unstressed condition against the surface of the material with the axis of the coil in the direction of the stress to be applied to the material, adhesive means securing each convolution of the coil independently to the material in the region where each convolution engages the material, and means for measuring any changes in the electric resistance of the coil caused as stresses are introduced into the coil when the material is subjected to tensional stresses effecting elongations of greater than about 1%.

2. The combination in a strain gauge of a material capable of elongations within its elastic limit of greater than about 1% when subject to stresses, a helically coiled strain gauge wire having a diameter of about one mil and coiled to a diameter of about one mil positioned in an unstressed condition against the surface of the material with the axis of the coil in the direction of the stress to be applied to the material, adhesive means securing at least the convolutions adjacent opposite ends of the coil to the material whereby the coil is elongated on its axis when the material is elongated, and means for measuring any changes in the electric resistance of the coil caused as stresses are introduced into the coil when the material is subjected to stresses effecting elongations of greater than about 1%.

3. The combination in a strain gauge of a material capable of elongations within its elastic limit of greater than about 1% when subject to stresses, a helically coiled strain gauge wire positioned in an unstressed condition against the surface of the material with the axis of the coil in the direction of the stress to be applied to the material, adhesive means securing at least the convolutions adjacent opposite ends of the coil to the material whereby the coil is elongated on its axis when the material is elongated, and means for measuring any changes in the electric resistance of the coil when the material is subjected to stresses effecting elongations of greater than about 1%.

4. The combination in a strain gauge of a material capable of elongations within its elastic limit of greater than about 1% when subject to stresses, a strain gauge wire, means securing the strain gauge wire to the material in an unstressed condition so it will be stressed in torsion when the material is elongated under stress, and means for measuring any changes in the electric resistance of the wire when the material is stressed.

5. In a strain gauge, a helical coil of resistance wire having a wire diameter of about one mil and internal coil diameter of about one mil, and adhesive means for securing each convolution of the coil to the material to be tested so that the coil is in an unstressed condition.

6. In a strain gauge for measuring elongations of greater than about 1%, a coil of resistance wire, and adhesive means for securing at least one convolution adjacent each end of the coil to the material to be tested so that the coil is in an unstressed condition.

7. The combination in a strain gauge of a material capable of elongations within its elastic limit of substantially greater than about 1% when subject to stresses, a strain gauge wire, means securing the strain gauge wire to the material in an unstressed condition so it will be stressed when the material is substantially elongated under stress, and means for measuring any changes in the electric resistance of the wire when the material is stressed.

8. In a strain gauge for measuring elongations of a material, a resistance wire having a multiplicity of accordion bend to permit substantial elongation thereof, and adhesive means securing every other bend of the wire to the material along the axis of elongation.

References Cited in the file of this patent

UNITED STATES PATENTS

| | | |
|---|---|---|
| 2,467,752 | Howe | Apr. 19, 1949 |
| 2,626,337 | Mitchell | Jan. 20, 1953 |
| 2,629,038 | Dietz | Feb. 17, 1953 |
| 2,870,630 | Sivertsen | Jan. 27, 1959 |